(12) United States Patent
Yamamoto et al.

(10) Patent No.: US 7,848,211 B2
(45) Date of Patent: Dec. 7, 2010

(54) OBJECTIVE LENS APPARATUS, OPTICAL PICKUP APPARATUS, AND OPTICAL DISC DRIVING APPARATUS

(75) Inventors: Kenji Yamamoto, Kanagawa (JP); Noriaki Nishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 748 days.

(21) Appl. No.: 11/790,543

(22) Filed: Apr. 26, 2007

(65) Prior Publication Data
US 2007/0263522 A1    Nov. 15, 2007

(30) Foreign Application Priority Data
May 9, 2006    (JP) .............................. 2006-130108

(51) Int. Cl.
*G11B 7/135*    (2006.01)
(52) U.S. Cl. .............................. 369/112.23; 369/112.01
(58) Field of Classification Search ............ 369/112.23, 369/112.01
See application file for complete search history.

(56) References Cited
U.S. PATENT DOCUMENTS
2002/0048248 A1 *  4/2002  Nakao ................... 369/112.12
2004/0114495 A1 *  6/2004  Kim et al. .............. 369/112.24

FOREIGN PATENT DOCUMENTS
JP    2005-293770    10/2005
JP    2005-302163    10/2005

* cited by examiner

*Primary Examiner*—Joseph H Feild
*Assistant Examiner*—Nicholas Lee
(74) *Attorney, Agent, or Firm*—Rader, Fishman & Grauer PLLC

(57) ABSTRACT

An objective lens apparatus is disclosed. The apparatus includes: a first objective lens with a first numerical aperture, which is capable of focusing a laser light on a first optical record medium with a first cover layer of a first thickness; a second objective lens with a second numerical aperture smaller than the first numerical aperture, which is capable of focusing the laser light on a second optical record medium with a second cover layer of a second thickness larger than the first thickness; a third objective lens with a third numerical aperture smaller than the second numerical aperture, which is capable of focusing the laser light on a third optical record medium with a third cover layer of a third thickness larger than the second thickness; and a lens holder which holds the first objective lens, the second objective lens, and the third objective lens.

15 Claims, 9 Drawing Sheets

| | φ (effective diameter) [mm] | f (focal length) [mm] | NA |
|---|---|---|---|
| CD objective lens | 1.8 | 1.765 (f1) | 0.51 |
| DVD objective lens | 1.8 | 1.385 (f2) | 0.65 |
| BD objective lens | 1.7 | 1.000 (f3) | 0.85 |

| | t (thickness of cover layer) [mm] |
|---|---|
| CD | 1.2 (t1) |
| DVD | 0.6 (t2) |
| BD | 0.1 (t3) |

OBJECTIVE LENS APPARATUS, OPTICAL PICKUP APPARATUS, AND OPTICAL DISC DRIVING APPARATUS

CROSS REFERENCES TO RELATED APPLICATIONS

The present invention contains subject matter related to Japanese Patent Application JP 2006-130108 filed in the Japanese Patent Office on May 9, 2006, the entire contents of which being incorporated herein by reference.

BACKGROUND OF THE INVENTION

1. Field of the Invention

The present invention relates to an optical pickup apparatus that optically records a signal to an optical record medium and/or reproduces a signal therefrom. The present invention also relates to an objective lens apparatus mounted in the optical pickup apparatus. The present invention also relates to an optical disc driving apparatus that mounts the optical pickup apparatus.

2. Description of the Related Art

As objective lenses mounted in optical pickups of related art that deal with three formats, for example, BD (Blu-ray Disc, trademark), DVD (Digital Versatile Disc), CD (Compact Disc), and so forth, the following objective lens are known (for example, Japanese Patent Application Laid-Open Nos. 2005-302163 and 2005-293770 referred to as Patent Document 1 and Patent Document 2, respectively).

In the optical pickup disclosed in Patent Document 1, a first objective lens (24) that focuses laser light having wavelengths of 400 to 410 nm to a BD (100c) and a second objective lens (25) that focuses laser light having wavelengths of 650 to 780 nm to a CD (100b) or a DVD (100a) are held by a movable block (12). In Patent Document 1, to decrease the thickness of the pickup, for example as shown in FIG. 7, in consideration of the working distance of each disc (100), namely the distance from the front surface of each disc to each objective lens, the neutral position in the focus direction of the movable block (12) is set. In other words, a two-wavelength compatible objective lens is used for a CD and a DVD because their focal lengths are nearly the same. The compatible objective lens is used, so it is a matter of course that their focal lengths are the same. Although their focal lengths are the same, since the thickness of the cover layer of the CD that laser light enters is different from that of the cover layer of the DVD that laser light enters, it is necessary to consider the working distances. As a result, the neutral position (that is a position apart from each disc by the working distance) of the focus stroke of the CD is different from that of the DVD. Thus, a total stroke takes place.

In this case, "stroke" is a range in which an objective lens is moved by an actuator. In Patent Document 1, to deal with the three formats including the BD, the objective lenses are designed so that the neutral position of the objective lens for the BD is in the middle between the neutral position of the objective lens for the CD and the neutral position of the objective lens for the DVD. As a result, the thickness in the focus direction of the optical pickup is decreased.

On the other hand, in Patent Document 2, a three-wavelength compatible objective lens that deals with the foregoing three formats is used.

SUMMARY OF THE INVENTION

Although the thickness of the optical pickup of Patent Document 1 is decreased, since the neutral position of the objective lens for the CD is different from that for the DVD, there is a difference between their working distances (ΔWD). As a result, the thickness in the optical axis direction of the objective lens of the optical pickup is increased by the difference of the working distances.

In Patent Document 2, the differences of optical path lengths in air corresponding to the differences of the cover layers of the BD, DVD, and CD that laser light enters (Δ cover thickness/refractive index of cover layer) become the differences of the center positions of the actuator strokes in the focus direction of the three-wavelength compatible lens (differences of neutral positions). Thus, in this structure, the stroke amounts become large, resulting in preventing the thickness of the optical pickup from being decreased.

In Patent Document 1, as described above, the focal length of the two-wavelength compatible objective lens is constant. However, the NA (Numerical Aperture) of the two-wavelength compatible objective lens for laser light used for the DVD is different from that for the CD. When the NA for the DVD is larger than that for the CD, the diameter of a laser beam for the DVD becomes unnecessarily large. In other words, when the two-wavelength compatible objective lens transmits laser light, the effective diameter of laser light for the CD is different from that for the DVD. Particularly, in Patent Document 2, when the three-wavelength compatible objective lens is used, since the NA for the BD is the largest, the beam diameter for the BD is larger than that for the DVD. Thus, in this case, the objective lens becomes huge.

In view of the foregoing, it would be desirable to provide an objective lens apparatus, an optical pickup apparatus, and an optical disc driving apparatus that deal with record media corresponding to three different types of formats and that allow the thicknesses of the apparatuses to be decreased.

According to an embodiment of the present invention, there is provided an objective lens apparatus including a first objective lens, a second objective lens, a third objective lens, and a lens holder. The first objective lens has a first numerical aperture and is capable of focusing laser light on a disc-shaped first optical record medium having a first cover layer which has a first thickness. The second objective lens has a second numerical aperture and is capable of focusing laser light on a disc-shaped second optical record medium having a second cover layer which has a second thickness, the second thickness being larger than the first thickness, the second numerical aperture being smaller than the first numerical aperture. The third objective lens has a third numerical aperture and is capable of focusing laser light on a disc-shaped third optical record medium having a third cover layer which has a third thickness, the third thickness being larger than the second thickness, the third numerical aperture being smaller than the second numerical aperture. The lens holder integrally holds the first objective lens, the second objective lens, and the third objective lens.

In this embodiment, the first, second, and third objective lenses are disposed corresponding to the first, second, and third optical record media, respectively. Thus, the positions in the focus directions of these objective lenses can be relatively changed corresponding to the working distances of these objective lenses and these objective lenses can be held by the lens holder. When these objective lenses are held at their optimum positions in their focus directions, an objective lens apparatus whose thickness is more decreased than related art can be accomplished.

In addition, since the first, second, and third objective lenses are disposed, the problem of which a lens such as a compatible objective lens of related art becomes large can be solved. Thus, this embodiment contributes to decreasing the thickness of the objective lens apparatus.

The "is capable of focusing" includes the state of which a signal is capable of being recorded or reproduced.

In this embodiment, the first objective lens has a first focal length and a first lens principal point. The second objective lens has a second focal length and a second lens principal point. The third objective lens has a third focal length and a third lens principal point. The lens holder holds the second objective lens such that the second lens principal point is placed at a position in a focus direction apart from the first lens principal point of the first objective lens by a distance of which a difference between the first focal length and the second focal length and an optical path length in air corresponding to a difference between the first thickness and the second thickness are added, and holds the third objective lens such that the third lens principal point is placed at a position in a focus direction apart from the first lens principal point by a distance of which a difference between the first focal length and the third focal length and an optical path length in air corresponding to a difference between the first thickness and the third thickness are added. Thus, the initial positions in the focus directions of the objective lenses (hereinafter these initial positions are referred to as "initial focus positions" or "center positions of strokes") are fixed by the holder. In other words, the neutral positions of the objective lenses described in Patent Documents 1 and 2 become constant. Thus, the differences of the neutral positions become zero. As a result, the thickness of the objective lens apparatus can be decreased.

In this embodiment, the difference of thicknesses of any two of the first cover layer, second cover layer, and third cover layer that laser light enters are replaced with optical path lengths in air and the initial focus positions of the objective lenses are offset with these optical path lengths. Thus, their differences are converted into and referred to as "optical path lengths in air".

The "focus direction" is a direction in which the objective lens apparatus approaches to or goes apart from the front surface of one of the first to third record media. In this embodiment, it is obvious that an objective lens having a larger numerical aperture is placed at a position closer to an optical record medium.

This embodiment is substantially the same as an embodiment of which the lens holder holds the first objective lens such that the first lens principal point is placed at a position in a focus direction apart from the second lens principal point of the second objective lens by a distance of which a difference between the second focal length and the first focal length and an optical path length in air corresponding to a difference between the second thickness and the first thickness are added and holds the third objective lens such that the third lens principal point is placed at a position in a focus direction apart from the second lens principal point by a distance of which a difference between the second focal length and the third focal length and an optical path length in air corresponding to a difference between the second thickness and the third thickness are added. In other words, in this embodiment, the second lens principal point of the second objective lens is set to a reference position.

This applies to the case that the third lens principal point of the third objective lens is set to a reference position. In this case, the lens holder holds the first objective lens such that the first lens principal point is placed at a position in a focus direction apart from the third lens principal point of the third objective lens by a distance of which a difference between the third focal length and the first focal length and an optical path length in air corresponding to a difference between the third thickness and the first thickness are added and holds the second objective lens such that the second lens principal point is placed at a position in a focus direction apart from the third lens principal point by a distance of which a difference between the third focal length and the second focal length and an optical path length in air corresponding to a difference between the third thickness and the second thickness are added.

In this embodiment, at least two of the first objective lens, the second objective lens, and the third objective lens are integrally cast. Thus, the distance of at least two objective lenses can be decreased. As a result, the size of the objective lens apparatus can be decreased. Thus, when the objective lens apparatus is manufactured, since the objective lenses are integrally cast, the mounting position accuracies and tilt accuracies of at least two objective lenses are improved.

In this embodiment, the first numerical aperture is in a range from 0.8 to 0.9, the second numerical aperture is in a range from 0.6 to 0.7, and the third numerical aperture is in a range from 0.45 to 0.55. In other words, this embodiment describes that the first optical record medium is a BD, the second optical record medium is a DVD or a HD (High Definition) DVD, and the third optical record medium is a CD. The ranges of the numeric values of these numerical apertures represent manufacturing tolerances of the first to third optical record media or those of the first to third objective lenses.

According to an embodiment of the present invention, there is provided an optical pickup apparatus including a light source, a first objective lens, a second objective lens, a third objective lens, a lens holder, and an actuator. The light source emits first laser light having a first wavelength, second laser light having a second wavelength larger than the first wavelength, and third laser light having a third wavelength larger than the second wavelength. The first objective lens has a first numerical aperture and is capable of focusing the first laser light on a disc-shaped first optical record medium having a first cover layer which has a first thickness. The second objective lens has a second numerical aperture and is capable of focusing the second laser light on a disc-shaped second optical record medium having a second cover layer which has a second thickness, the second thickness being larger than the first thickness, the second numerical aperture being smaller than the first numerical aperture. The third objective lens has a third numerical aperture and is capable of focusing the third laser light on a disc-shaped third optical record medium having a third cover layer which has a third thickness, the third thickness being larger than the second thickness, the third numerical aperture being smaller than the second numerical aperture. The lens holder holds the first objective lens, the second objective lens, and the third objective lens. The actuator drives the lens holder.

In this embodiment, the "light source" may be light sources each of which emits laser light. Instead, the "light source" may be a light source that is composed of one physical structure. The "first wavelength" is for example in the range from 400 to 410 nm, the "second wavelength" is for example in the range from 650 to 660 nm, and the "third wavelength" is for example in the range from 770 to 830 nm. However, they are not limited to these ranges.

The "actuator" is a driving mechanism that drives the lens holder holding each objective lens at least in the tracking direction and the focus direction to record or reproduce a signal. The actuator may be of any type as long as it is driven for example electromagnetically, electrostatically, or piezoelectrically.

In this embodiment, the lens holder holds the first objective lens and the second objective lens such that $\Delta ST1 < L1$ is satisfied where $\Delta ST1$ is a difference in a focus direction between a center position of a stroke of the first objective lens and a center position of a stroke of the second objective lens by the actuator, and L1 is an optical path length in air corresponding to a difference between the first thickness and the second thickness. Instead, in this embodiment, the lens holder holds the second objective lens and the third objective lens such that $\Delta ST2 < L2$ is satisfied where $\Delta ST2$ is a difference in a focus direction between a center position of a stroke of the second objective lens and a center position of a stroke of the third objective lens by the actuator, and L2 is an optical path length in air corresponding to a difference between the second thickness and the third thickness. Instead, in this embodiment, the lens holder holds the third objective lens and the first objective lens such that $\Delta ST3 < L3$ is satisfied where $\Delta ST3$ is a difference in a focus direction between a center position of a stroke of the third objective lens and a center position of a stroke of the first objective lens by the actuator, and L3 is an optical path length in air corresponding to a difference between the third thickness and the first thickness.

According to an embodiment of the present invention, there is provided an optical disc driving apparatus, including a rotating and driving mechanism, a first objective lens, a second objective lens, a third objective lens, a lens holder, an actuator, and a recording/reproducing process section. The rotating and driving mechanism rotates and drives a disc-shaped first optical record medium having a first cover layer which has a first thickness, a disc-shaped second optical record medium having a second cover layer which has a second thickness, the second thickness being larger than the first thickness, or a disc-shaped third optical record medium having a third cover layer which has a third thickness, the third thickness being larger than the second thickness. The first objective lens has a first numerical aperture and is capable of focusing a laser light on the first optical record medium. The second objective lens has a second numerical aperture smaller than the first numerical aperture and is capable of focusing the laser light on the second optical record medium. The third objective lens has a third numerical aperture smaller than the second numerical aperture and is capable of focusing the laser light on the third optical record medium. The lens holder integrally holds the first objective lens, the second objective lens, and the third objective lens. The actuator drives the lens holder. The recording/reproducing process section records a signal to the first optical record medium, the second optical record medium, or the third optical record medium rotated and driven by the rotating and driving mechanism or reproduces a signal therefrom with the first objective lens, the second objective lens, or the third objective lens. The "recording/reproducing process section" means a member, a function, a process circuit, or the like that is necessary to record or reproduce a signal.

According to an embodiment of the present invention, there is provided a method of driving objective lenses. A first objective lens having a first numerical aperture is caused to focus laser light on a disc-shaped first optical record medium having a first cover layer having a first thickness. A second objective lens having a second numerical aperture smaller than the first numerical aperture is caused to focus laser light on a disc-shaped second optical record medium having a second cover layer having a second thickness larger than the first thickness. A third objective lens having a third numerical aperture smaller than the second numerical aperture is caused to focus laser light on a disc-shaped third optical record medium having a third cover layer having a third thickness larger than the second thickness. A lens holder which integrally holds the first objective lens, the second objective lens, and the third objective lens is driven so that a signal is recorded or reproduced.

As described above, according to these embodiments, record media of three formats can be handled and the thicknesses of the apparatuses can be decreased.

These and other objects, features and advantages of the present invention will become more apparent in light of the following detailed description of a best mode embodiment thereof, as illustrated in the accompanying drawings.

BRIEF DESCRIPTION OF DRAWINGS

The invention will become more fully understood from the following detailed description, taken in conjunction with the accompanying drawings, wherein similar reference numerals denote similar elements, in which.

DESCRIPTION OF PREFERRED EMBODIMENTS

Next, with reference to the accompanying drawings, embodiments of the present invention will be described.

Figure 1:
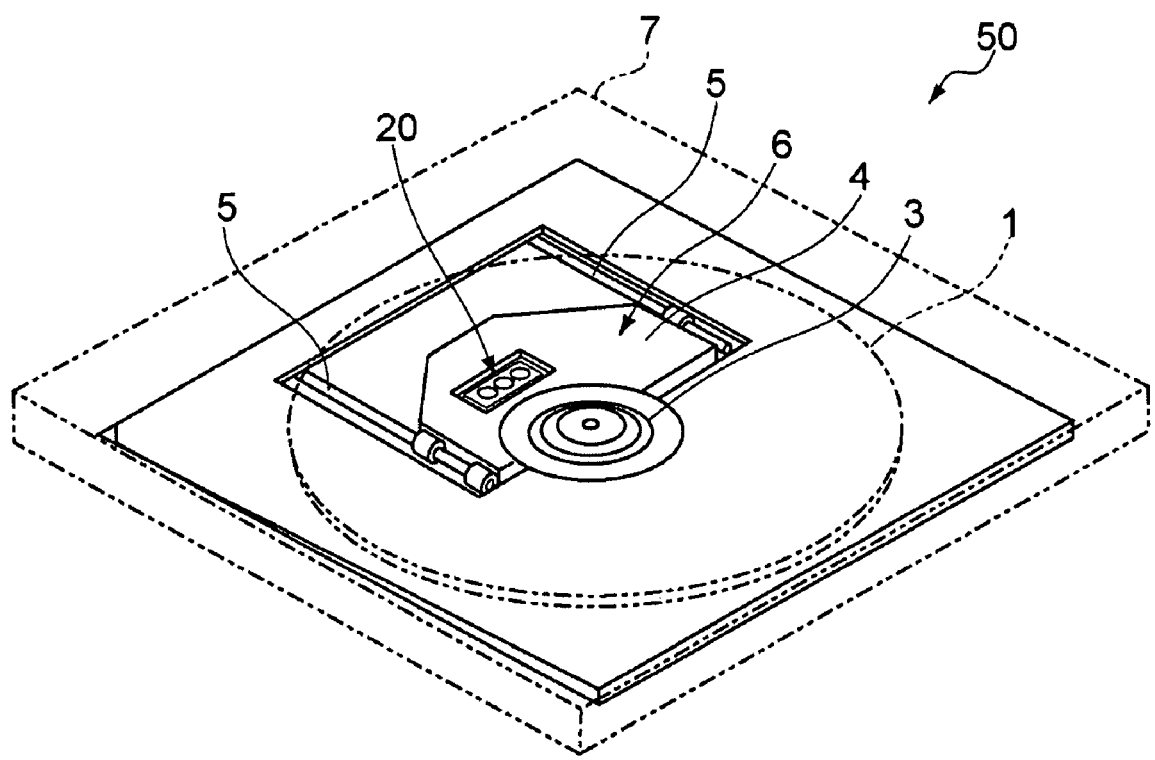
FIG. 1 is an exploded perspective view showing an optical disc driving apparatus according to an embodiment of the present invention.
Figure 2:
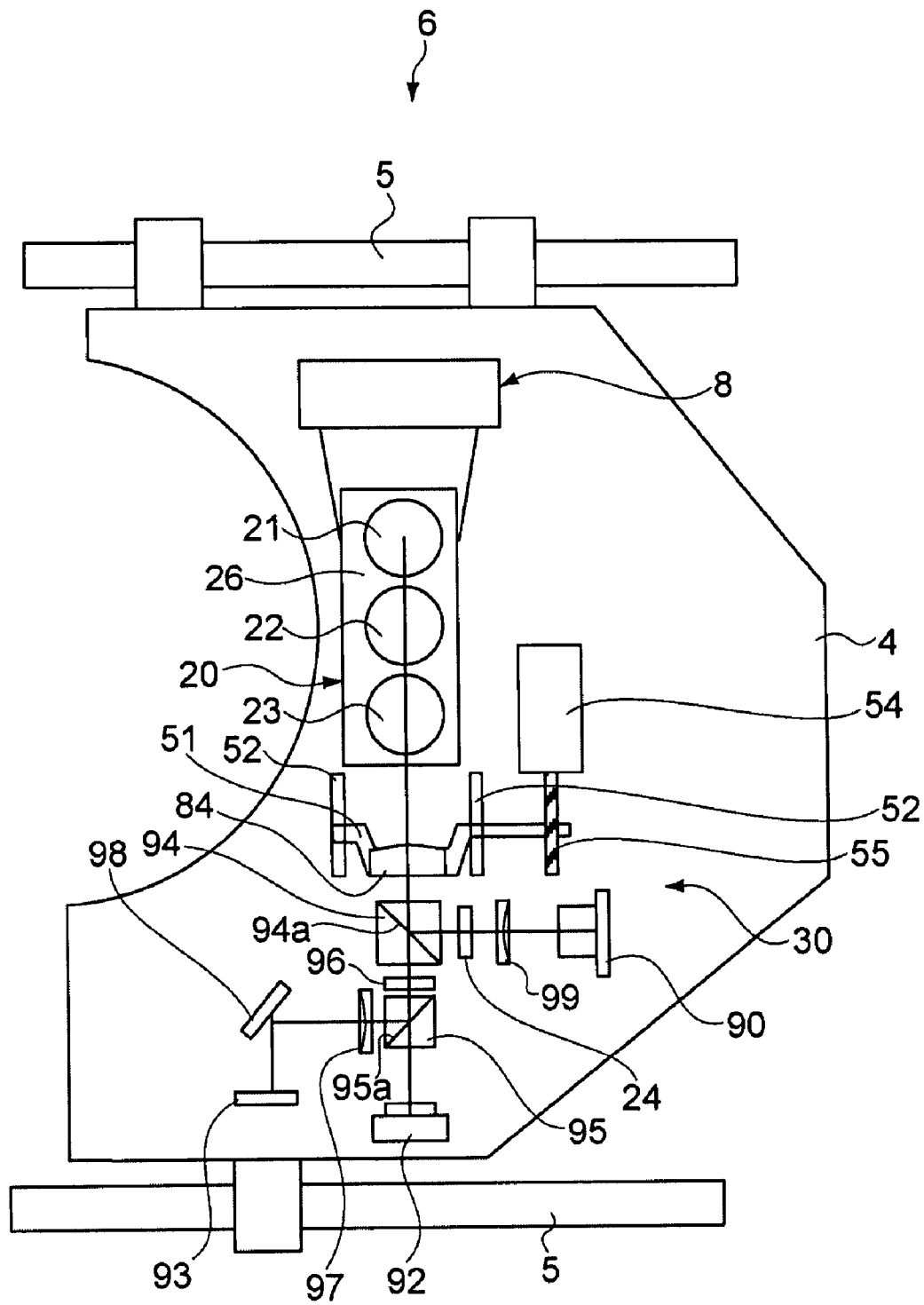
FIG. 2 is a plan view schematically showing an optical pickup apparatus mounted in the optical disc driving apparatus shown in FIG. 1.

FIG. 1 is an exploded perspective view schematically showing an optical disc driving apparatus 50 according to an embodiment of the present invention. FIG. 2 is a plan view schematically showing an optical pickup apparatus mounted in the optical disc driving apparatus 50 shown in FIG. 1.

The optical disc driving apparatus 50 is an apparatus that records and reproduces information to and from an optical disc (DVD±R/RW, CD-R/RW, or BD) 1 as an optical record medium. The optical disc 1 may have a single signal record layer or a plurality of signal record layers. In the following description, the optical disc 1 may be referred to as a "BD 100", a "DVD 200", or a "CD 300". These three optical discs or four optical discs including a HD DVD may be collectively referred to as the "optical disc 1".

The optical disc driving apparatus 50 has for example a disc table 3 on which the optical disc 1 is loaded, an optical pickup apparatus 6 in which an optical system and so forth that will be described later are mounted, and a housing 7 that houses the optical disc 1 and the optical pickup apparatus 6.

The disc table 3 has a chucking mechanism with which the optical disc 1 is loaded on the disc table 3. The chucking mechanism allows the optical disc 1 to be loaded and rotated on the disc table 3.

The optical pickup apparatus 6 has a movable base 4, an optical system 30 mounted on the movable base 4, and an actuator 8 that drives a light collecting device (objective lens apparatus) 20. The movable base 4 is connected to a rotating shaft of a thread motor (not shown) and is slidable in the radial direction of the optical disc 1 along guide shafts 5 disposed on both ends of the optical pickup apparatus 6. The actuator 8 is a two-axis actuator that drives and controls for example focus servo and tracking servo mechanisms that move the light collecting device 20 in the focus direction and the tracking direction. Instead of the two-axis actuator, the actuator 8 may be a three-axis actuator that is capable of moving the light collecting device 20 in a tilt angle direction to the optical disc 1 along with the focus direction and the tracking direction.

Figure 3:
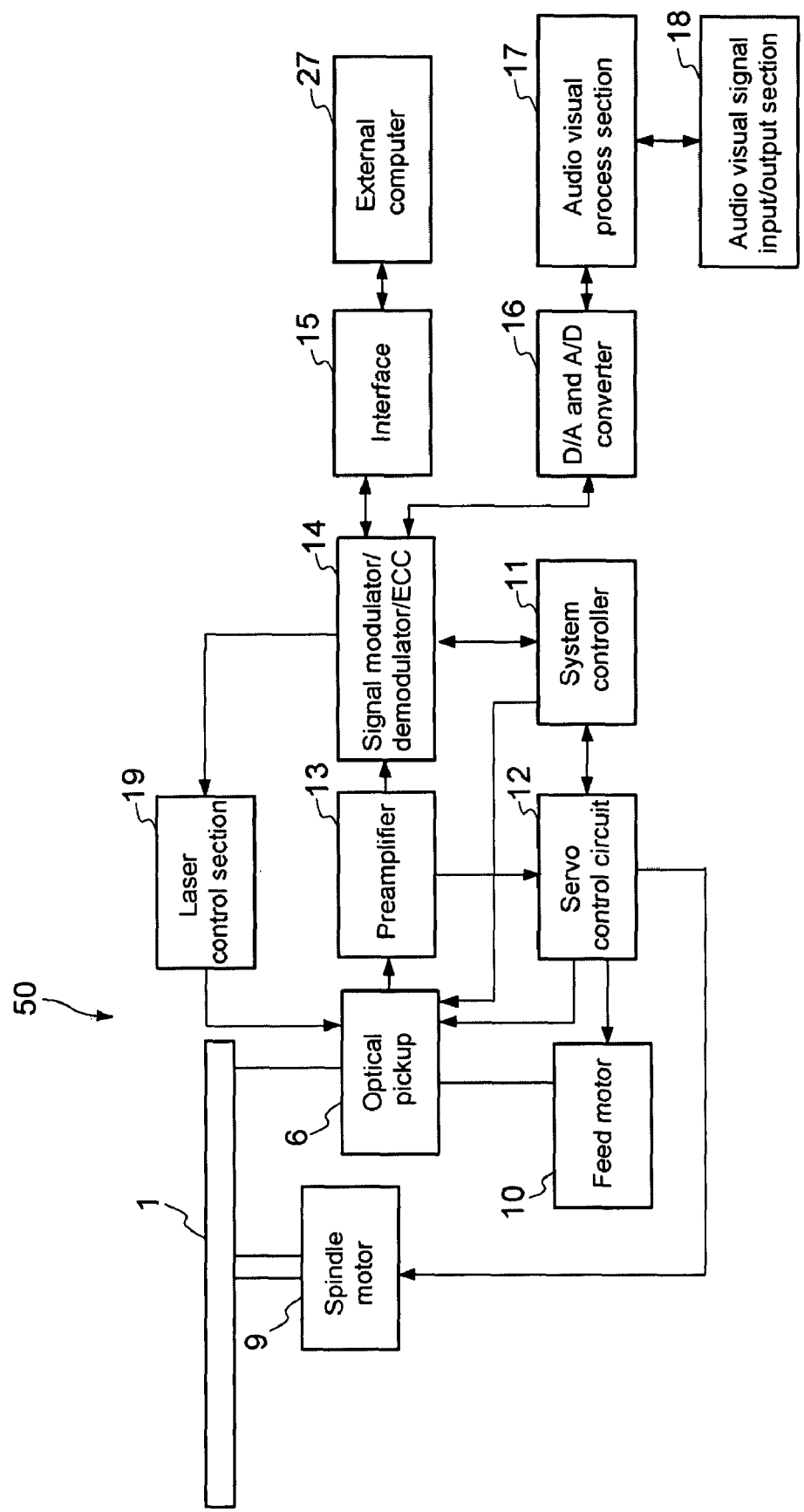
FIG. 3 is a block diagram showing a structure of the optical disc driving apparatus shown in FIG. 1.

FIG. 3 is a block diagram showing a structure of the optical disc driving apparatus 50 shown in FIG. 1.

As shown in FIG. 2, together with the optical pickup apparatus 6, the optical disc driving apparatus 50 has a spindle motor 9, a feed motor 10, a system controller 11, a servo control circuit 12, a preamplifier 13, a signal modulator/demodulator/ECC (error correction coding) section 14, an interface 15, a D/A and A/D converter 16, an audio visual process section 17, an audio visual signal input/output section 18, and a laser control section 19.

The spindle motor 9 is a motor that rotates and drives the optical disc 1. The disc table 3 and the spindle motor 9 compose a rotating and driving mechanism.

The feed motor 10 is a motor that moves the movable base 4 shown in FIG. 1 in the radial direction of the optical disc 1. Thus, the feed motor 10 moves the optical pickup apparatus 6 in the radial direction of the optical disc 1.

The system controller 11 is disposed to control the overall optical disc driving apparatus 50 and independently performs a signal process and controls servo mechanisms.

The servo control circuit 12 generates a focus servo signal and a tracking servo signal based on signals (focus error signal and tracking error signal) obtained from the preamplifier 13 and supplies these signals to the optical pickup apparatus 6 and the feed motor 10.

The preamplifier 13 generates the focus error signal, the tracking error signal, and an RF signal with signals obtained by the optical pickup apparatus 6.

The signal modulator/demodulator/ECC (error correction coding) section 14 demodulates the RF signal, obtains a record signal, and performs an error correction coding process for the record signal. For example, the signal modulator/demodulator/ECC section 14 adds an ECC to a record signal and corrects an error of a reproduction signal (RF signal).

The interface 15 exchanges signals with an external computer 27.

The D/A and A/D converter 16 converts the reproduction signal as a digital signal into an analog signal and converts the record signal as an analog signal into a digital signal.

The audio visual process section 17 and the audio visual signal input/output section 18 exchange an audio signal and a video signal with an external device.

The laser control section 19 controls an output and a wavelength of a semiconductor laser mounted in the optical pickup apparatus 6 depending on record mode, a reproduction mode, type of the optical disc 1, and so forth.

The optical disc driving apparatus 50 causes the spindle motor 9 to rotate the optical disc 1 and drive and control the feed motor 10 with the control signal supplied from the servo control circuit 12. By moving the optical pickup apparatus 6 to a position corresponding to a desired record track of a selected signal record layer of the optical disc 1, the optical disc driving apparatus 50 records and reproduces information to and from the selected signal record layer.

Referring to FIG. 2, the optical system 30 has a single wavelength laser diode 90, a laser coupler 92, a photo detector 93, a first adjustment lens 99, a λ/2 plate 96, a first polarizing beam splitter 94, a second polarizing beam splitter 95, a second adjustment lens 97, a mirror 98, a grating 24, a collimator lens 84, and the light collecting device 20.

The single wavelength laser diode 90 emits laser light having wavelengths of 400 to 410 nm corresponding to the BD 100 (hereinafter this laser light is referred to as the first laser light). The laser coupler 92 has a light receiving and emitting device that emits laser light having wavelengths of 650 to 660 nm corresponding to the DVD 200 (this laser light is referred to as the second laser light) and laser light having wavelengths of 770 to 830 nm corresponding to the CD 300 (hereinafter this laser light is referred to as the third laser light) and receives reflected lights of the second and third laser lights from the optical discs.

The photo detector 93 detects return light of the first laser light reflected from the optical disc 1. The second adjustment lens 97 adjusts the beam diameter with which the photo detector 93 properly detects the return light. The mirror 98 guides the first laser light emitted from the second adjustment lens 97 to the photo detector 93.

The collimator lens 84 collimates laser light having each wavelength that the first polarizing beam splitter 94 has transmitted or reflected. The collimator lens 84 is supported by a lens holder 51. In addition, both ends of the lens holder 51 are supported by a pair of guide shafts 52 that extend in the optical axis direction. In addition, since the lens holder 51 is fit to a lead screw 55 of a drive motor 54, the lens holder 51 is movable in the optical axis direction. The lead screw 55 of the drive motor 54 is rotated and driven corresponding to the format of the optical disc 1. As a result, the lens holder 51 is moved in the optical axis direction. Thus, spherical aberration of the collimator lens 84, which occurs due to the thickness of the cover layer on the front surface that differs in each format of the optical disc 1 that laser light enters, can be compensated.

Figure 4:
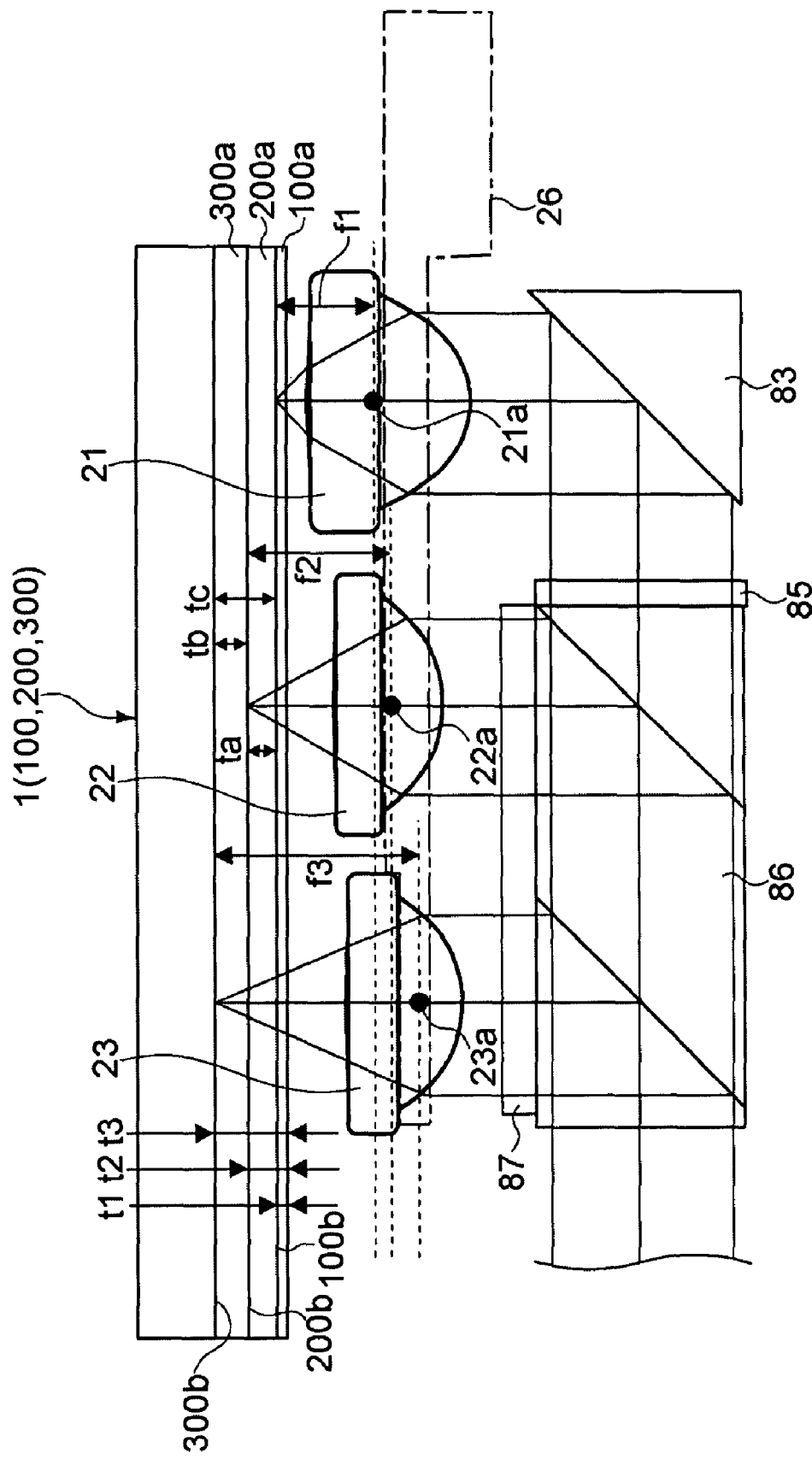
FIG. 4 is a side view showing a light collecting device contained in an optical system of the optical pickup apparatus shown in FIG. 3.

FIG. 4 is a side view showing a peripheral portion of the light collecting device contained in the optical system 30 of the optical pickup apparatus 6 shown in FIG. 2. The optical system 30 also has a prism 86, a mirror 83, a first λ/4 plate 87, and a second λ/4 plate 85.

The prism 86 transmits the first laser light that the collimator lens 84 has transmitted and reflects the second or third laser light that the collimator lens 84 has transmitted to the optical disc 1 side. The mirror 83 reflects the first laser light that the collimator lens 84 and the prism 86 have transmitted to the optical disc 1 side. The first λ/4 plate 87 converts linearly polarized light of the second or third laser light that the prism 86 has reflected into circularly polarized light. The second λ/4 plate 85 converts linearly polarized light of the first laser light that the prism 86 has transmitted into circularly polarized light.

The prism 86 has separation films 86a and 86b that have wavelength dependencies and reflection and transmission film characteristics depending on the order of the corresponding objective lens. However, as will be described later, when a DVD objective lens 22 is used as an HD DVD objective lens, since the wavelength of the laser light for the BD is the same as that for the HD DVD, it is necessary to optimally set the ratio of reflection and transmission of the separation films 86a and 86b of the prism 86.

A light emitting section of the single wavelength laser diode 90 emits the first laser light to the first polarizing beam splitter 94. The laser light emitted from the single wavelength laser diode 90 is rotated by the grating 24 having a function of a λ/2 plate for the first laser light such that S polarized light of the first laser light enters the first polarizing beam splitter 94. In addition, the grating 24 divides the first laser light into three beams to generate a tracking error signal according to the differential push-pull method. Thereafter, the three beams enter the first polarizing beam splitter 94.

Figures 5, 6, 7:
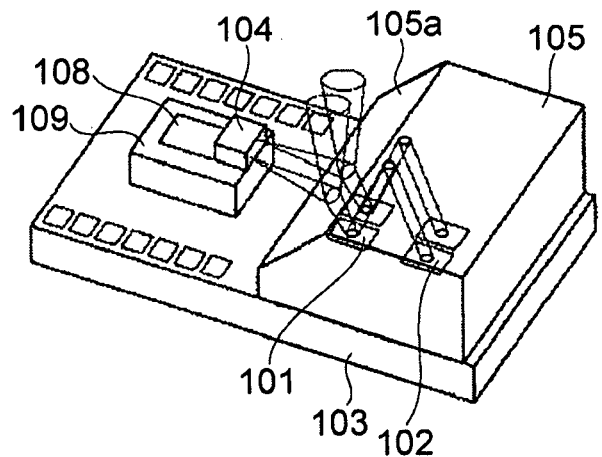
FIG. 5 is a perspective view showing a laser coupler.
FIG. 6 is a table that lists φ (effective diameter), f (focal length), and NA of each of objective lenses for a CD, a DVD, and a BD.
FIG. 7 is a table that lists thicknesses of cover layers of the CD, DVD, and BD.

FIG. 5 is a perspective view showing the laser coupler 92. In FIG. 5, a member such as a package that covers the laser coupler 92 is not shown. The laser coupler 92 has a silicon chip 103 on its surface area. The silicon chip 103 has photo detectors 101 and 102 that detect return lights of the second and third laser lights, respectively. Mounted on the silicon chip 103 is a photo diode chip 109. Mounted on the photo diode chip 109 is a two-wavelength laser diode 104. The two-wavelength laser diode 104 is mounted on the silicon chip 103 through the photo diode chip 109 having a PIN photo diode 108 on its surface area. The PIN photo diode 108 mounted on the photo diode chip 109 monitors laser light emitted from the rear surface of the two-wavelength laser diode 104 to control the output of the two-wavelength laser diode 104.

Mounted on the silicon chip 103 is a prism 105 having a tilt plane 105a that reflects the second or third laser light emitted from the two-wavelength laser diode 104 nearly at right angles. The laser light reflected on the tilt plane 105a travels to the second polarizing beam splitter 95. On the other hand, the return light reflected on the signal record surface of the optical disc 1 passes through the tilt plane 105a of the prism 105. As a result, the return light is detected by the photo detectors 101 or 102.

With reference to FIG. 2, the first and second polarizing beam splitters 94 and 95 each have a wavelength selection function. In other words, the first and second polarizing beam splitters 94 and 95 are devices that transmit or reflect incident light depending on its wavelength. The first and second polarizing beam splitters 94 and 95 are composed of an optical thin film having a predetermined structure formed on bonded planes 94a and 95a of the prisms. Thus, the first polarizing beam splitter 94 transmits the second and third laser lights regardless of their polarized states. In contrast, the first polarizing beam splitter 94 transmits or reflects the first laser light depending on its polarized state. Likewise, the second polarizing beam splitter 95 transmits the second and third laser lights regardless of their polarized states. In contrast, the second polarizing beam splitter 95 transmits or reflects the first laser light depending on its polarized state.

More specifically, when the single wavelength laser diode 90 emits the first laser light and the incident angle of the first laser light as the S polarized light generated by the grating 24 is a designed center value, the first polarizing beam splitter 94 totally reflects the first laser light to the collimator lens 84 side through the bonded plane 94a. On the other hand, when the first laser light is reflected on the signal record surface of the optical disc 1 and the incident angle of the return light of the first laser light as the P polarized light generated by the second λ/4 plate 85 is a designed center angle, the first polarizing beam splitter 94 totally transmits the first laser light to the second polarizing beam splitter 95 side.

The λ/2 plate 96 is disposed between the first polarizing beam splitter 94 and the second polarizing beam splitter 95. The λ/2 plate 96 changes the return light of the first laser light as the P polarized right that the first polarizing beam splitter 94 has transmitted to the S polarized light. The S polarized light enters the second polarizing beam splitter 95. Like the first polarizing beam splitter 94, when the incident angle of the first laser light as the S polarized light is a designed center value, the second polarizing beam splitter 95 totally reflects the first laser light through the bonded plane 95a. The return light reflected on the bonded plane 95a enters the light reception plane of the photo detector 93 through the second adjustment lens 97 and the mirror 98.

The light collecting device 20 has a BD objective lens 21 that focuses the first laser light on the signal record surface of the optical disc 1, a DVD objective lens that focuses the second laser light on the signal record surface of the optical disc 1, a CD objective lens 23 that focuses the third laser light on the signal record surface of the optical disc 1, and a lens holder 26 that integrally holds the BD, DVD, and CD objective lenses 21, 22, and 23. The lens holder 26 is typically made of a resin. Instead, the lens holder 26 may be made of a light metal such as aluminum. Instead, the lens holder 26 may be made of other than these materials.

Since the BD, DVD, and CD objective lenses 21, 22, and 23 corresponding to the three disc formats are independently disposed, they can be held by the lens holder 26 such that the positions in the focus directions of the objective lenses 21, 22, and 23 are relatively changed depending on their working distances. When the objective lenses 21, 22, and 23 are held at optimum positions in their focus directions, an objective lens apparatus whose thickness is more decreased than related art can be accomplished. The optimum positions at which the objective lenses 21, 22, and 23 are held will be described later.

In addition, when the BD, DVD, and CD objective lenses 21, 22, and 23 are independently disposed, the problem of which lenses such as compatible objective lenses of related art become large can be solved. Thus, this structure contributes to decreasing the thickness of the objective lens apparatus. This point will be described later in detail.

In the optical system 30, the first laser light emitted from the single wavelength laser diode 90 is changed to S polarized light by the grating 24. Thus, the first laser light as the S polarized light is totally reflected on the bonded plane 94a of the first polarizing beam splitter 94. The first laser light that has been totally reflected is focused on a signal record surface 100b through the collimator lens 84 that has been set for a predetermined focal length that allows spherical aberration of the BD 100 to be removed, the objective lens 21, and a cover layer 100a of the BD 100. On the other hand, the return laser light reflected on the signal record surface 100b of the BD 100 is changed to P polarized light by the second λ/4 plate 85. As a result, the laser light as the P polarized light is totally transmitted by the first polarizing beam splitter 94. The return first laser light that has been totally transmitted is changed to S polarized light by the λ/2 plate 96 disposed immediately before the second polarizing beam splitter 95. As a result, the first laser light as the S polarized light is totally reflected on the bonded plane 95a of the second polarizing beam splitter 95 and then focused on the light receiving surface of the photo detector 93.

In addition, the second or third laser light emitted from the laser coupler 92 is divided into three beams by a grating (not shown) disposed at an upper portion of the package that covers the laser coupler and then totally transmitted by the second polarizing beam splitter 95, the λ/2 plate 96, and the first polarizing beam splitter 94. The second or third laser light that has been totally transmitted is focused on the signal record surface 200b or 300b through the collimator lens 84 that has been set for a predetermined focal length that allows spherical aberration of the DVD 200 or CD 300 to be removed, and the DVD objective lens 22 or the CD objective lens, and a cover layer 200a or 300a of the DVD 200 or CD 300. On the other hand, the return second or third laser light reflected on the signal record surface 200b or 300b of the DVD 200 or CD 300 enters the laser coupler 92 through the same optical path as the going path. The return second or third laser light is transmitted on the tilt plane 105a of the prism 105 and then focused on the photo detector 101 or 102.

In this embodiment, as the tracking servo method, the three-beam method was exemplified. Instead, any known tracking servo method may be used. In the optical system 30, only the first laser light is selectively transmitted or reflected. Instead, with the polarized light separation films (bonded planes 94a and 95a) of the first and second polarizing beam splitters 94 and 95, only the second laser light may be selectively transmitted or reflected.

FIG. 6 is a table that lists φ (effective diameter) (mm), f (focal length) (mm), and NA of each of the CD objective lens 23, DVD objective lens 22, and BD objective lens 21 according to this embodiment of the present invention. FIG. 7 is a table that lists t (thickness) (mm) of each of the cover layers 300a, 200a, and 100a of the CD 300, DVD 200, and BD 100. With respect to φ and f, the values of the table are just examples. These values depend on the designed sizes of the objective lenses. With respect to NA, the values of the table may have a range to some extent. In particular, NA of the CD objective lens 23 has a range from 0.45 to 0.55. With respect to t, the values of the table may deviate within a margin of error. Hereinafter, the thickness of the cover layer of the BD is represented by t1, the thickness of the cover layer of the DVD is represented by t2, and the thickness of the cover layer of the CD is represented by t3 (see FIG. 4).

As shown in FIG. 4, the lens principal points of the BD, DVD, and CD objective lenses 21, 22, and 23 are referred to as a first lens principal point 21a, a second lens principal point 22a, and a third lens principal point 23a, respectively. The lens principal point is the optical center of a lens and is the center point on the basis of which the focal length f is defined. The BD, DVD, and CD objective lenses 21, 22, and 23 have a first focal length f1, a second focal length f2, and a third focal length f3, respectively.

In this example, the difference between the first focal length f1 and the second focal length f2 is represented by Δfa, the difference between the second focal length f2 and the third focal length f3 is represented by Δfb, and the difference between the third focal length f3 and the first focal length f1 is represented by Δfc. In addition, the difference between the thicknesses of the cover layers 100a and 200a of the BD 100 and the DVD 200 that laser light enters is represented by Δta (=t2−t1), the difference between the thicknesses of the cover layers 200a and 300a of the DVD 200 and the CD 300 that laser light enters is represented by Δtb (=t3−t2), and the difference between the thicknesses of the cover layers 300a and 100a of the CD 300 and the BD 100 that laser light enters is represented by Δtc (=t3−t1).

The example shown in FIG. 6 denotes that Δfa=0.385, Δfb=0.380, Δfc=0.765, Δta=0.5, Δtb=0.6, and Δtc=1.1.

The optical path length L1 of laser light in air corresponding to Δta, the optical path length L2 of laser light in air corresponding to Δtb, and the optical path length L3 of laser light in air corresponding to Δtc can be expressed by the following formulas.

$$L1 = \Delta ta / \text{refractive index of cover layer} \quad (1)$$

$$L2 = \Delta tb / \text{refractive index of cover layer} \quad (2)$$

$$L3 = \Delta tc / \text{refractive index of cover layer} \quad (3)$$

When the cover layers of the BD 100, DVD 200, and CD 300 that laser light enters are made of for example polycarbonate resin, since the refractive index thereof is 1.6, in the example shown in FIG. 6, the optical paths are as follows.

$$L1 = 0.5/1.6 \approx 0.31 \quad (4)$$

$$L2 = 0.6/1.6 \approx 0.38 \quad (5)$$

$$L3 = 1.1/1.6 \approx 0.69 \quad (6)$$

When the cover layers of the BD, DVD, and CD objective lenses 21, 22, and 23 are made of other than polycarbonate resin, since the refractive index thereof is different from 1.6, the optical paths L1, L2, and L3 are different from the foregoing values.

In this embodiment, the differences of the thicknesses of the cover layers 100a, 200a, and 300a that laser light enters are replaced with optical path lengths in air and the initial focus positions of the objective lenses 21, 22, and 23 are offset with the optical path lengths. The initial focus position is the center position of the stroke of the lens holder 26 by the actuator 8. In this embodiment, the differences of the center positions of the strokes of the BD, DVD, and CD objective lenses 21, 22, and 23 can be set to zero.

It can be thought that formulas (1), (2), and (3) represent the differences of the center positions of the strokes of the optical pickup using the two-wavelength compatible objective lens of related art.

(a) in the case of formula (1), it is assumed that a BD/DVD compatible objective lens and an independent CD objective lens are used. In this case, the difference between the center positions of the strokes of the BD/DVD compatible objective lens and the CD objective lens is L1.

(b) in the case of formula (2), it is assumed that a DVD/CD compatible objective lens and an independent BD objective lens are used. In this case, the difference between the center positions of the strokes of the DVD/CD compatible objective lens and the BD objective lens is L2.

(c) in the case of formula (3), it is assumed that a BD/CD compatible objective lens and an independent DVD objective lens are used. In this case, the difference between the center positions of the strokes of the BD/CD compatible objective lens and the DVD objective lens is L3.

As will be described later, in this embodiment, the stroke differences of the objective lenses 21, 22, and 23 are smaller than any of (a) to (c) of related art. Specifically, the BD, DVD, and CD objective lenses 21, 22, and 23 are held at the following positions by the lens holder 26.

The lens holder 26 holds the BD objective lens 21 at a predetermined position in the focus direction thereof. Although the predetermined position is not limited, it becomes a reference position. The lens holder 26 holds the DVD objective lens 22 such that the second lens principal point 22a is placed at a position in the focus direction apart from the first lens principal point 21a as the reference position by a distance of which Δfa and L1 are added. The focal lengths are considered because the BD objective lens 21, the DVD objective lens 22, and the CD objective lens 23 are independently disposed and their focal lengths are different from each other.

Of course, in this case, it is necessary to align the objective lenses 21, 22, and 23 in the focus direction such that the stroke of the DVD objective lens 22 and the stroke of the BD objective lens 21 are contained in the stroke of the CD objective lens 23 as shown in FIG. 4. In other words, the BD objective lens 21, the DVD objective lens 22, and the CD objective lens 23 are successively aligned on the near side of the optical disc 1.

In addition, the lens holder 26 holds the CD objective lens 23 such that the third lens principal point 23a is placed at a position in the focus direction apart from the first lens principal point 21a as the reference position by Δfc+L3.

Thus, since the lens holder allows the maximum value (ΔST) of the differences of the center positions of the strokes of the objective lenses 21, 22, and 23 to be zero, the thickness of the light collecting device 20 can be decreased. As a result, the thicknesses of the optical pickup apparatus 6 and the optical disc driving apparatus 50 can be decreased.

The "maximum value" means the largest value of the difference between the center positions of the strokes of the BD objective lens 21 and the DVD objective lens 22, the difference between the center positions of the strokes of the DVD objective lens 22 and the CD objective lens 23, and the difference between the center positions of the strokes of the CD objective lens 23 and the BD objective lens 21.

In this case, the effective diameters of the objective lenses 21, 22, and 23 are nearly the same. The relationship of effective diameter φ, NA, and focal length f is given as follows:

$$\phi = 2 \times NA \times f$$

Thus, as disclosed in Patent Documents 1 and 2, when a compatible objective lens is used, since f is fixed, the effective diameter becomes large in proportion to NA. However, when a compatible objective lens is not used as in this embodiment, the effective diameters of the BD and DVD do not unnecessarily become large. Therefore, a disadvantage is not caused for decreasing the size and thickness of the optical pickup. This is because in this embodiment, the three objective lenses 21, 22, and 23 are independently disposed and their focal lengths are selectable.

In this embodiment, without necessity of a special prism (31) shown in FIG. 2 of Japanese Patent Application Laid-Open No. 2005-100513, the thickness of the optical pickup apparatus 6 can be decreased.

In this embodiment, since the three objective lenses 21, 22, and 23 are independently disposed, although the light collecting device 20 becomes heavy, the total weight of the three objective lenses 21, 22, and 23 is nearly the same as the giant lens such as the three-wave compatible objective lens of related art.

In this embodiment, since the differences of the center positions of the strokes are removed and the strokes become short, the actuator 8 can be easily designed. In other words, a DC gain and a frequency band of the servo operation of the actuator 8 can be suppressed. In addition, since the strokes become short, a signal can be recorded and reproduced at high speed.

As described above, it is most preferred that the maximum value ΔST of the differences of the center positions of the strokes of the objective lenses 21, 22, and 23 be zero. However, it is not necessary that the maximum value Δ be zero. In this embodiment, when the difference of the center positions of the strokes of the BD objective lens 21 and the DVD objective lens 22 is represented by ΔST1, it is preferred that the lens holder 26 hold the BD objective lens 21 and the DVD objective lens 22 such that the following relationship is satisfied.

$$\Delta ST1 < L1 \tag{7}$$

Instead, when the difference between the center positions of the strokes of the DVD objective lens 22 and the CD objective lens 23 is represented by ΔST2, it is preferred that the lens holder 26 hold the DVD objective lens 22 and the CD objective lens 23 such that the following relationship is satisfied.

$$\Delta ST2 < L2 \tag{8}$$

Instead, when the difference between the center positions of the strokes of the CD objective lens 23 and the BD objective lens 21 is represented by ΔST3, it is preferred that the lens holder 26 hold the CD objective lens 23 and the BD objective lens 21 such that the following relationship is satisfied.

$$\Delta ST3 < L3 \tag{9}$$

When expressions (7), (8), and (9) are applied to the example shown in FIGS. 6 and 7, the value of L1≈0.31 is the minimum value. Thus, it is most preferred that expression (7) be satisfied.

When the center positions of the strokes of the BD objective lens 21 and the DVD objective lens 22 deviate from the center position of the stroke of the CD objective lens 23 for example by around 0.1 mm, the performance of the actuator 8 and the effect of which the thickness of the actuator 8 is decreased are the same as those in the case that ΔST is zero. In other words, the specified warping values of the BD and DVD are smaller than that of the CD. Thus, the amount of surface fluctuation of each of the BD and DVD is smaller than that of the CD. The maximum specified warping value of the BD and DVD is ±0.3 mm, whereas the maximum specified warping value of the CD is ±0.4 mm. In other words, although the BD objective lens 21 or the DVD objective lens 22 deviates from the center position of the stroke of the CD objective lens 23 by 0.1 mm, the center position of the stroke of the BD objective lens 21 or DVD objective lens 22 is in the stroke range of the CD whose amount of surface fluctuation is the largest.

Figure 8:
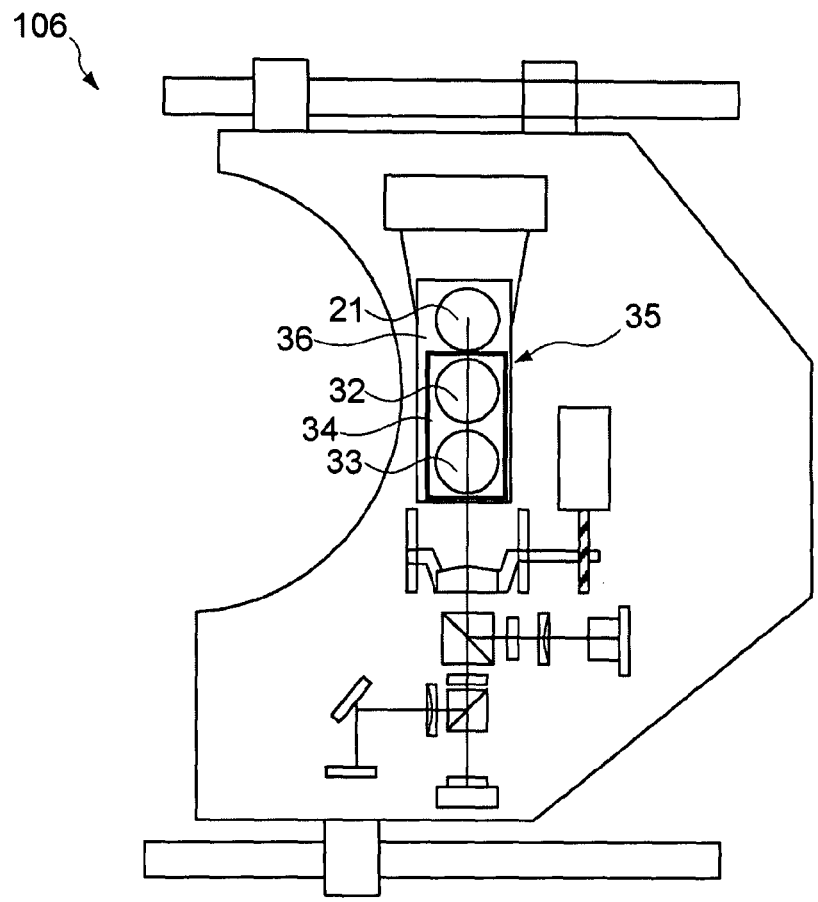
FIG. 8 is a plan view showing an optical pickup apparatus according to another embodiment of the present invention.
Figure 9:
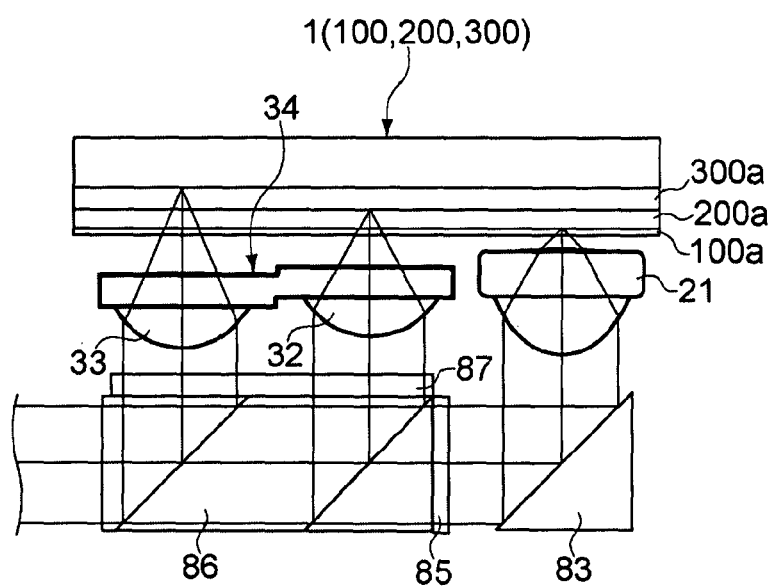
FIG. 9 is a side view showing a peripheral portion of the light collecting device of the optical pickup apparatus shown in FIG. 8.

FIG. 8 is a plan view showing an optical pickup apparatus 106 according to another embodiment of the present invention. FIG. 9 is a side view showing a peripheral portion of a light collecting device 35 of the optical pickup apparatus 106. Description of members and functions of the optical pickup apparatus 106 similar to those of the optical pickup apparatus 6 shown in FIG. 2 and FIG. 4 will be simplified or omitted. Only members and functions of the optical pickup apparatus 106 different from those of the optical pickup apparatus 6 will be described.

In the light collecting device 35 of the optical pickup apparatus 106, a DVD objective lens 32 and a CD objective lens 33 are integrally cast as a DVD/CD objective lens unit 34. In this case, the objective lenses 32 and 33 may be made of resin or glass. The DVD/CD objective lens unit 34 and the BD objective lens 21 are independent members. These objective lenses are integrally held by a lens holder 36. In this structure, the distance between the two objective lenses 32 and 33 can be shortened. As a result, the sizes of the light collecting device 35 and the optical pickup apparatus 106 can be decreased. In addition, since they are integrally cast, when the light collecting device 35 is manufactured, the mounting position accuracies and tilt accuracies of the two objective lenses 32 and 33 are improved.

Thus, not only the DVD objective lens 32 and the CD objective lens 33 are integrally cast, but all the BD, DVD, and CD objective lenses may be integrally cast. Instead, the BD and CD objective lenses may be integrally cast, whereas the DVD objective lens may be independently disposed.

Figure 10:
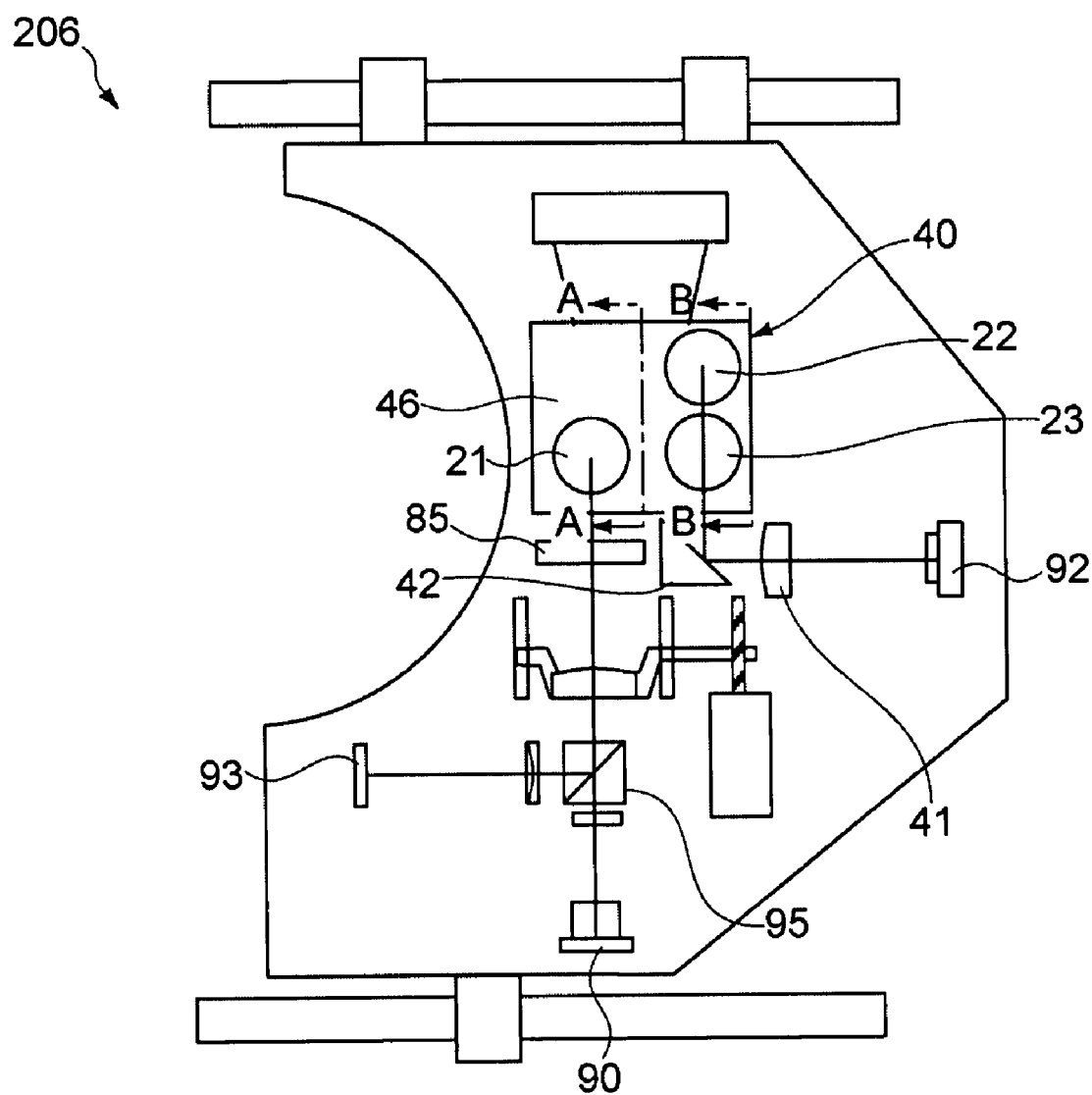
FIG. 10 is a plan view showing an optical pickup apparatus according to another embodiment of the present invention.
Figure 11A:
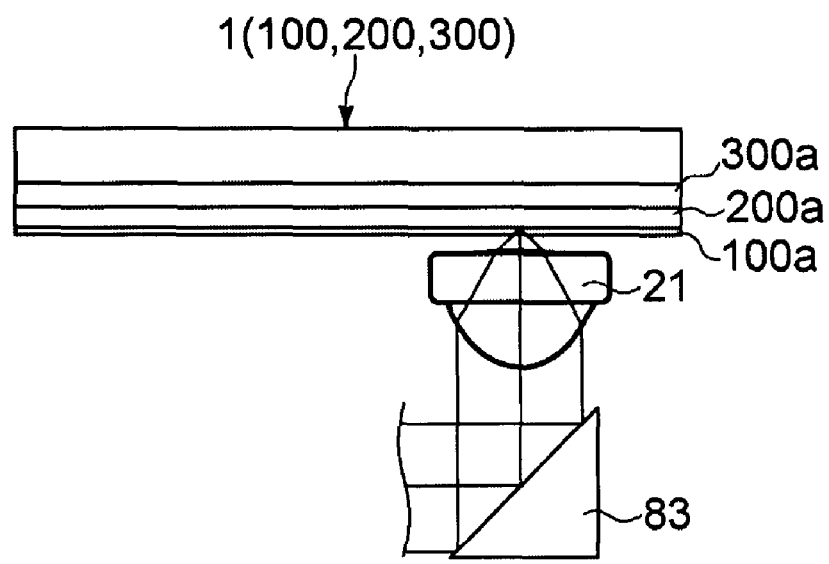
FIG. 11A is a sectional view taken along line A-A of FIG. 10.
Figure 11B:
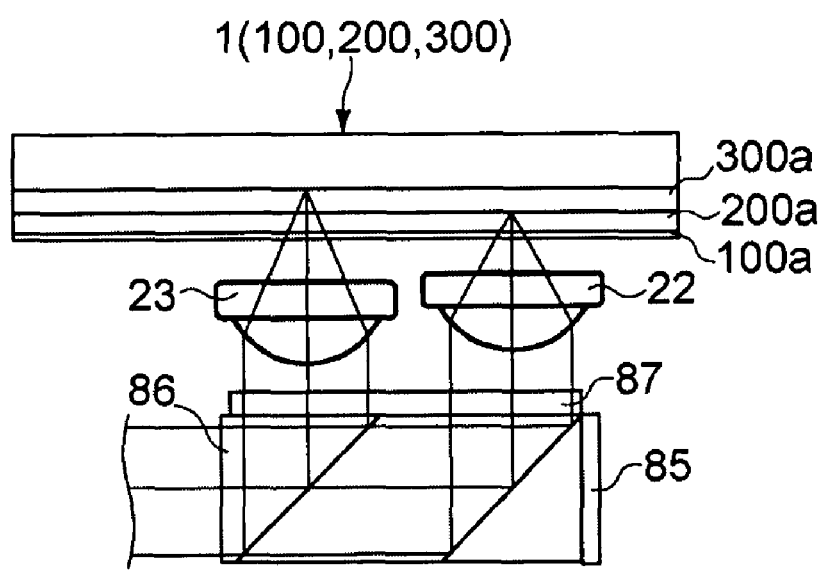
FIG. 11B is a sectional view taken along line B-B of FIG. 10.

FIG. 10 is a plan view showing an optical pickup apparatus 206 according to another embodiment of the present invention. FIG. 11A is a sectional view taken along line A-A of FIG. 10. FIG. 11B is a sectional view taken along line B-B of FIG. 10. In a light collecting device 40 of the optical pickup apparatus 206, a BD objective lens 21 and a CD objective lens 23 are aligned in the radial direction of the optical disc 1. In addition, the CD objective lens 23 and a DVD objective lens 22 are aligned in the tangential direction of the optical disc 1. The BD, DVD, and CD objective lenses 21, 22, and 23 are integrally held by a lens holder 46.

In the optical pickup apparatus 206, the positions of the single wavelength laser diode 90 and the laser coupler 92 are reversed from those shown in FIG. 2 due to the positions of the objective lenses 21, 22, and 23. In addition, in the optical pickup apparatus 206, a light collecting lens 41, a mirror 42, and so forth are disposed.

In this embodiment, depending on designing conditions such as the structure, arrangement, and so forth of each part that composes the light collecting device 40 or designing conditions of an optical disc driving apparatus that mounts the optical pickup apparatus 206, the positions of the objective lenses 21, 22, and 23 of the light collecting device 40 can be laid out. For example, in FIG. 10, the positions of the BD objective lens 21 and the CD objective lens 23 may be reversed. Likewise, the positions of the CD objective lens 23 and the DVD objective lens 22 may be reversed. Likewise, the positions of the BD objective lens 21 and the DVD objective lens 22 may be reversed. Instead, the objective lenses 21, 22, and 23 may be aligned at an angle to the radial direction.

Figure 12:
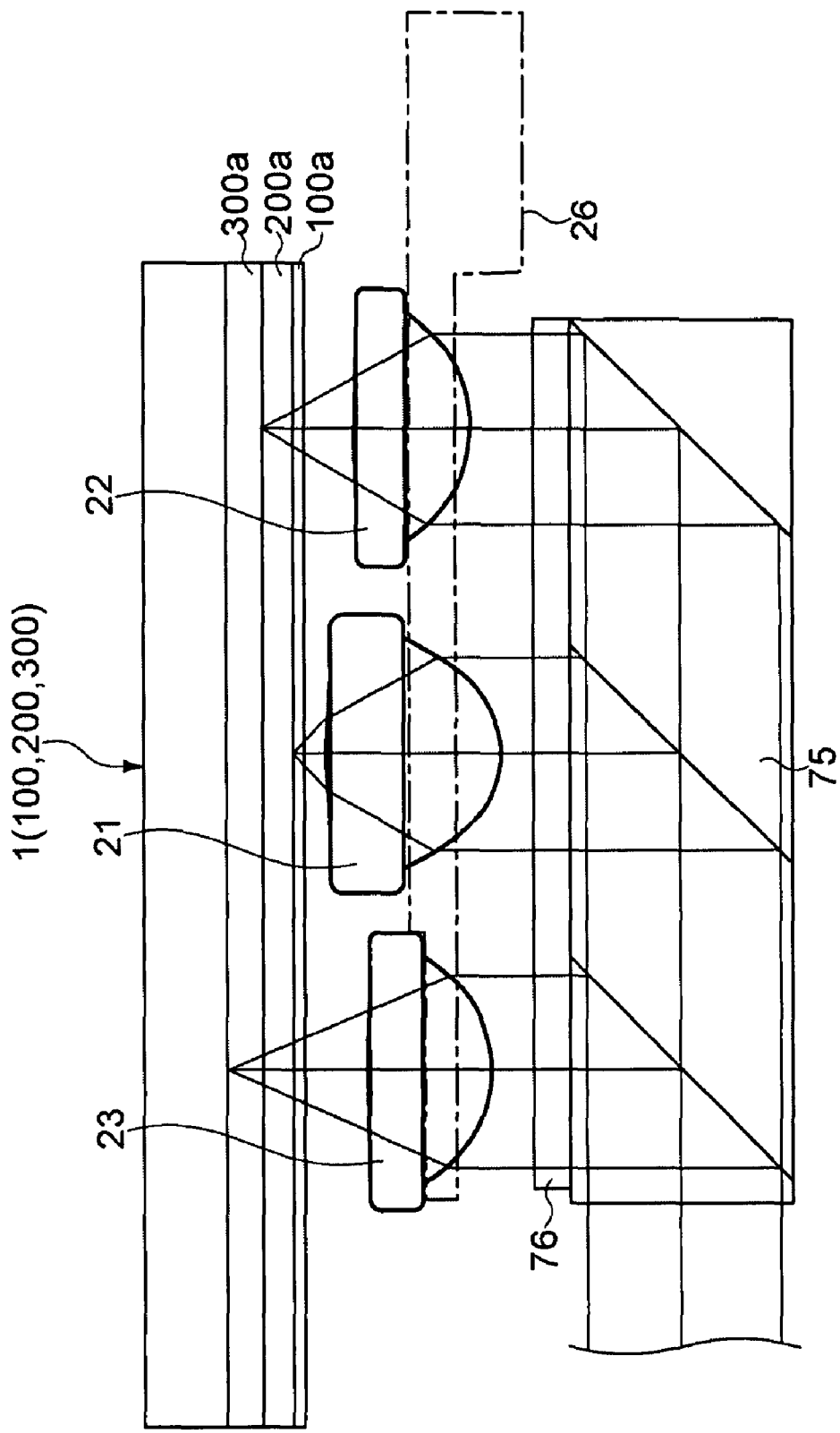
FIG. 12 is a side view showing a light collecting device according to another embodiment of the present invention, the objective lens for the BD being disposed in the middle of the light collecting device.

FIG. 12 is a side view showing a light collecting device 40 according to another embodiment of the present invention. In the light collecting device, a BD objective lens is disposed at the center of objective lenses. In this example, a CD objective lens 23, a BD objective lens 21, and a DVD objective lens 22 are held by a lens holder 26 such that they are successively aligned on the near side of a light source (not shown). In this case, as shown in FIG. 4, a prism 86 and a mirror 83 may be disposed. In FIG. 12, one prism 75 may be disposed. A λ/4 plate 76 is disposed between the prism 75 and each of the objective lenses 21, 22, and 23.

It should be understood by those skilled in the art that various modifications, combinations, sub-combinations and alternations may occur depending on design requirements and other factors insofar as they are within the scope of the appended claims or the equivalents thereof.

In the optical system 30 shown in FIG. 2 and FIG. 4, a part of optical paths of the first, second, and third laser lights is shared. Instead, the optical system 30 may be structured such that the optical paths of the first, second, and third laser lights are independent from each other.

The DVD objective lens 22 of the light collecting device 20 shown in FIG. 4 may be used for an HD DVD objective lens. In other words, the optical pickup apparatus 6 can deal with optical discs corresponding to four formats with three objective lenses 21, 22, and 23. The NA and thickness of the cover layer that are important design conditions for the DVD objective lens are nearly the same as those of the HD DVD objective lens. Thus, when a wavelength selective hologram is used, the DVD objective lens 22 can be used in common with the HD DVD objective lens.

What is claimed is:

1. An objective lens apparatus, capable of focusing a laser light on a first optical record medium, a second optical record medium, and a third optical record medium, each being disc shaped; the first optical record medium having a first cover layer which has a first thickness, the second optical record medium having a second cover layer which has a second thickness larger than the first thickness, the third optical record medium having a third cover layer which has a third thickness larger than the second thickness, the laser light entering each of the cover layers, comprising:

a first objective lens which has a first numerical aperture and which is capable of focusing the laser light on the first optical record medium;

a second objective lens which has a second numerical aperture smaller than the first numerical aperture and which is capable of focusing the laser light on the second optical record medium;

a third objective lens which has a third numerical aperture smaller than the second numerical aperture and which is capable of focusing the laser light on the third optical record medium; and a lens holder which holds the first objective lens, the second objective lens, and the third objective lens;

wherein the first objective lens has a first focal length and a first lens principal point, wherein the second objective lens has a second focal length and a second lens principal point, wherein the third objective lens has a third focal length and a third lens principal point, and wherein the lens holder holds the second objective lens such that the second lens principal point is placed at a position in a focus direction apart from the first lens principal point of the first objective lens by a distance of which a difference between the first focal length and the second focal length and an optical path length in air corresponding to a difference between the first thickness and the second thickness are added, and holds the third objective lens such that the third lens principal point is placed at a position in a focus direction apart from the first lens principal point by a distance of which a difference between the first focal length and the third focal length and an optical path length in air corresponding to a difference between the first thickness and the third thickness are added.

2. The objective lens apparatus as set forth in claim 1, wherein at least two of the first objective lens, the second objective lens, and the third objective lens are integrally cast.

3. The objective lens apparatus as set forth in claim 1, wherein the first numerical aperture is in a range from 0.8 to 0.9, wherein the second numerical aperture is in a range from 0.6 to 0.7, and wherein the third numerical aperture is in a range from 0.45 to 0.55.

4. An optical pickup apparatus capable of irradiating a first optical record medium, a second optical record medium, and a third optical record medium with a laser light, each being disc shaped, the first optical record medium having a first cover layer which has a first thickness, the second optical record medium having a second cover layer which has a second thickness larger than the first thickness, the third optical record medium having a third cover layer which has a third thickness larger than the second thickness, the laser light entering each of the cover layers, comprising:

a light source which emits a first laser light having a first wavelength, a second laser light having a second wavelength larger than the first wavelength, and a third laser light having a third wavelength larger than the second wavelength;

a first objective lens which has a first numerical aperture and which is capable of focusing the first laser light on the first optical record medium;

a second objective lens which has a second numerical aperture smaller than the first numerical aperture and which is capable of focusing the second laser light on the second optical record medium;

a third objective lens which has a third numerical aperture smaller than the second numerical aperture and which is capable of focusing the third laser light on the third optical record medium;

a lens holder which holds the first objective lens, the second objective lens, and the third objective lens; and an actuator which drives the lens holder;

wherein the lens holder holds the first objective lens and the second objective lens such that $\Delta ST1 < L1$ is satisfied where $\Delta ST1$ is a difference in a focus direction between a center position of a stroke of the first objective lens and a center position of a stroke of the second objective lens by the actuator, and L1 is an optical path length in air corresponding to a difference between the first thickness and the second thickness.

5. The optical pickup apparatus as set forth in claim 4, wherein the lens holder holds the second objective lens and the third objective lens such that $\Delta ST2 < L2$ is satisfied where $\Delta ST2$ is a difference in a focus direction between a center position of a stroke of the second objective lens and a center position of a stroke of the third objective lens by the actuator, and L2 is an optical path length in air corresponding to a difference between the second thickness and the third thickness.

6. The optical pickup apparatus as set forth in claim 4, wherein the lens holder holds the third objective lens and the first objective lens such that $\Delta ST3 < L3$ is satisfied where $\Delta ST3$ is a difference in a focus direction between a center position of a stroke of the third objective lens and a center position of a stroke of the first objective lens by the actuator, and L3 is an optical path length in air corresponding to a difference between the third thickness and the first thickness.

7. The optical pickup apparatus as set forth in claim 4, wherein the first objective lens has a first focal length and a first lens principal point, wherein the second objective lens has a second focal length and a second lens principal point, wherein the third objective lens has a third focal length and a third lens principal point, and wherein the lens holder holds the second objective lens such that the second lens principal point is placed at a position in a focus direction apart from the first lens principal point of the first objective lens by a distance of which a difference between the first focal length and the second focal length and an optical path length in air corresponding to a difference between the first thickness and the second thickness are added, and holds the third objective lens such that the third lens principal point is placed at a position in a focus direction apart from the first lens principal point by a distance of which a difference between the first focal length and the third focal length and an optical path length in air corresponding to a difference between the first thickness and the third thickness are added.

8. The optical pickup apparatus as set forth in claim 4, wherein at least two of the first objective lens, the second objective lens, and the third objective lens are integrally cast.

9. The optical pickup apparatus as set forth in claim 4, wherein the first numerical aperture is in a range from 0.8 to 0.9, wherein the second numerical aperture is in a range from 0.6 to 0.7, and wherein the third numerical aperture is in a range from 0.45 to 0.55.

10. An optical disc driving apparatus that records a signal to a first optical record medium, a second optical record medium, and a third optical record medium, each being disc shaped, or reproduces the signal therefrom, the first optical record medium having a first cover layer which has a first thickness, the second optical record medium having a second cover layer which has a second thickness larger than the first thickness, the third optical record medium having a third cover layer which has a third thickness larger than the second thickness, a laser light entering each of the cover layers, comprising:

a rotating and driving mechanism which rotates and drives the first optical record medium, the second optical record medium, or the third optical record medium;

a first objective lens which has a first numerical aperture and which is capable of focusing the laser light on the first optical record medium;

a second objective lens which has a second numerical aperture smaller than the first numerical aperture and which is capable of focusing the laser light on the second optical record medium;

a third objective lens which has a third numerical aperture smaller than the second numerical aperture and which is capable of focusing the laser light on the third optical record medium;

a lens holder which holds the first objective lens, the second objective lens, and the third objective lens;

an actuator which drives the lens holder; and a recording/reproducing process section which records a signal to the first optical record medium, the second optical record medium, or the third optical record medium rotated and driven by the rotating and driving mechanism or reproduces the signal therefrom with the first objective lens, the second objective lens, or the third objective lens;

wherein the lens holder holds the first objective lens and the second objective lens such that $\Delta ST1 < L1$ is satisfied where $\Delta ST1$ is a difference in a focus direction between a center position of a stroke of the first objective lens and a center position of a stroke of the second objective lens by the actuator, and L1 is an optical path length in air corresponding to a difference between the first thickness and the second thickness.

11. The optical disc driving apparatus as set forth in claim 10, wherein the lens holder holds the second objective lens and the third objective lens such that $\Delta ST2 < L2$ is satisfied where $\Delta ST2$ is a difference in a focus direction between a center position of a stroke of the second objective lens and a center position of a stroke of the third objective lens by the actuator, and L2 is an optical path length in air corresponding to a difference between the second thickness and the third thickness.

12. The optical disc driving apparatus as set forth in claim 10, wherein the lens holder holds the third objective lens and the first objective lens such that $\Delta ST3 < L3$ is satisfied where $\Delta ST3$ is a difference in a focus direction between a center position of a stroke of the third objective lens and a center position of a stroke of the first objective lens by the actuator, and L3 is an optical path length in air corresponding to a difference between the third thickness and the first thickness.

13. The optical disc driving apparatus as set forth in claim 10, wherein the first objective lens has a first focal length and a first lens principal point, wherein the second objective lens has a second focal length and a second lens principal point, wherein the third objective lens has a third focal length and a third lens principal point, and wherein the lens holder holds the second objective lens such that the second lens principal point is placed at a position in a focus direction apart from the first lens principal point of the first objective lens by a distance of which a difference between the first focal length and the second focal length and an optical path length in air corresponding to a difference between the first thickness and the second thickness are added, and holds the third objective lens such that the third lens principal point is placed at a position in a focus direction apart from the first lens principal point by a distance of which a difference between the first focal length and the third focal length and an optical path length in air corresponding to a difference between the first thickness and the third thickness are added.

14. The optical disc driving apparatus as set forth in claim 10, wherein at least two of the first objective lens, the second objective lens, and the third objective lens are integrally cast.

15. The optical disc driving apparatus as set forth in claim 10, wherein the first numerical aperture is in a range from 0.8 to 0.9, wherein the second numerical aperture is in a range from 0.6 to 0.7, and wherein the third numerical aperture is in a range from 0.45 to 0.55.

* * * * *